(12) United States Patent
Konermann

(10) Patent No.: US 8,562,204 B2
(45) Date of Patent: Oct. 22, 2013

(54) APPARATUS FOR METERING AND MIXING POURABLE MATERIAL COMPONENTS

(75) Inventor: Stefan Konermann, Remscheid (DE)

(73) Assignee: Plast-Control GmbH, Remscheid (DE)

( * ) Notice: Subject to any disclaimer, the term of this patent is extended or adjusted under 35 U.S.C. 154(b) by 857 days.

(21) Appl. No.: 12/680,560

(22) PCT Filed: Oct. 16, 2008

(86) PCT No.: PCT/EP2008/008785
§ 371 (c)(1),
(2), (4) Date: Mar. 26, 2010

(87) PCT Pub. No.: WO2009/049893
PCT Pub. Date: Apr. 23, 2009

(65) Prior Publication Data
US 2010/0220546 A1  Sep. 2, 2010

(30) Foreign Application Priority Data
Oct. 18, 2007 (DE) .......... 10 2007 050 268

(51) Int. Cl.
*B01F 15/02* (2006.01)
(52) U.S. Cl.
USPC ....................... 366/141; 366/181.3
(58) Field of Classification Search
USPC .............. 366/141, 177.1, 181.1, 181.8, 181.3
See application file for complete search history.

(56) References Cited

U.S. PATENT DOCUMENTS

| 3,822,866 A | 7/1974 | Daester et al. |
| 4,678,046 A | 7/1987 | Mosher |
| 4,812,047 A * | 3/1989 | Baumann ...................... 366/141 |

FOREIGN PATENT DOCUMENTS

| CN | 2668373 Y | 1/2005 |
| DE | 2131600 | 12/1972 |
| DE | 3818637 A1 | 12/1989 |
| DE | 9403812 A | 6/1994 |
| EP | 0170322 A | 2/1986 |
| EP | 0959982 B1 | 12/1999 |
| FR | 2599142 A | 11/1987 |
| JP | 56-129823 A | 10/1981 |
| WO | 98/25695 A1 | 6/1998 |
| WO | 2006/114994 A | 11/2006 |

* cited by examiner

*Primary Examiner* — David Sorkin
(74) *Attorney, Agent, or Firm* — Richard M. Goldberg

(57) ABSTRACT

Apparatus for dosed mixing of pourable material components, includes a mixing container, two weighing containers, each of the weighing containers including a closable discharge opening for discharging the weighing container into the mixing container; and a weighing device for weighing the content of the weighing container, and several storage containers for respective material components, each storage container including a feeding device for feeding material from the storage container to an assigned weighing container, and the mixing container is arranged below the weighing containers such that the weighing containers are simultaneously dischargeable through the discharge openings into the mixing container.

6 Claims, 2 Drawing Sheets

APPARATUS FOR METERING AND MIXING POURABLE MATERIAL COMPONENTS

BACKGROUND OF THE INVENTION

The invention relates to an apparatus for dosed mixing of pourable material components, in particular a gravimetric dosing apparatus. Further, the invention relates to a plastics processing machine having such an apparatus. Pourable material components are to be understood as comprising, in particular, bulk material, but also material components capable of flowing, for example a liquid material component.

When manufacturing plastic products, usually the used material components are fed in the form of a bulk material, in particular a granulated material or a powder. For example, it is known to feed different material components one after another to a weighing container, until in each case that weight of the weighing container is reached, which is necessary for the allotted proportion of quantity of the material component. When all material components are present in the designated proportions in the weighing container, for example, a delivery flap or a gate is opened, and the material is transferred into a mixing container. In the mixing container, a mixer provides for a homogenous mixing of the material components. The mixing container is in turn connected to a processing machine, e.g., an extruder. An apparatus of the kind described above is known from EP 0 959 982 B1.

When the performance of such a conventional plastics processing machine is to be increased, the throughput of respective feeding devices for the material components must be increased in order to be able to more rapidly fill the weighing container. In order to be able to achieve a higher throughput, while maintaining the same accuracy of the material components, which are fed by time controlled opening of the feeding device, considerable additional constructive efforts are required at the feeding devices. Moreover, the weighing of each added material component requires a suspension of the filling procedure of the weighing container, and, thus, is time consuming. Furthermore, the weighing procedure itself requires a certain amount of time. In order to achieve an increase of the performance by an increased throughput of the feeding devices in an efficient manner, thus, the weighing container would also have to be made larger in order to avoid an unreasonably frequent, time consuming weighing procedure. Furthermore, a weighing device suitable for a larger weight would have to be applied.

From DE 38 18 637 A1, an apparatus for mixing material components is known, wherein, for each material component, a weighing container of its own is provided, and wherein a movable collecting container approaches the filled weighing containers one after another and receives the respective weighed material component. Afterwards, all material components received in the collecting container are discharged to a mixer. It is a disadvantage that such a machine requires a large amount of space, and that the movable collecting container is technically complex.

SUMMARY OF THE INVENTION

It is an object of the invention to provide an apparatus of the kind mentioned initially which allows to achieve a considerable increase of performance in comparison to a conventional apparatus, with only slightly increased constructive efforts.

According to the invention, this object is achieved by an apparatus of the kind mentioned initially, comprising:
 a mixing container,
 two weighing containers, wherein each of the weighing containers comprises a closable discharge opening for discharging the weighing container into the mixing container; and a weighing device for weighing a content of the weighing container, and
 several storage containers for respective material components, wherein each storage container comprises a feeding device for feeding material of the storage container to a weighing container assigned to the storage container,
 wherein the mixing container is arranged below the weighing containers such that the weighing containers are simultaneously dischargeable through the discharge openings into the mixing container.

Preferably, each weighing container tapers downwards, being funnel-shaped, to the discharge opening.

The apparatus according to the invention allows to simultaneously fill the weighing containers with one material component each and to weigh them, so that considerable time is saved regarding shorter filling times as well as regarding a lower number of suspensions of the filling procedure for weighing.

The arrangement of the mixing container below the weighing containers according to the invention furthermore allows an operating mode, wherein the respective weighing containers are dischargeable into the mixing container independently from each other and, in particular, at unpredictable times. The respective time of discharging may then be chosen depending on whether the designated amounts of material are already present with sufficient accuracy in the respective weighing container, or whether an addition is necessary, i.e. whether a deviation of a fed amount of a material component from a desired value is detected and, therefore, a correction amount of a material component has to be fed to one of the weighing containers. Due to this independence, an exceptionally high performance of the apparatus is achievable with a high mixing accuracy.

It is to be noted that the usage of exactly two weighing containers results in an only slightly increased space required for the weighing containers in comparison to a conventional machine having a single weighing container, even if each weighing container alone has a receiving capacity which already corresponds to the conventional weighing container. Thus, a movable mixing container, as is known, for example, from DE 38 18 637 A1, is not necessary. Furthermore, due to a distribution of the pouring cones of the respective material components among different positions in the two weighing containers, the weighing containers are suitable for a still larger overall amount of material.

A further advantage is, that, in comparison to a conventional apparatus having only a single weighing container, the invention allows to use the same feeding devices; thus, in particular, the throughput of the feeding devices does not have to be increased. Furthermore, the same weighing device may be applied, since the individual weighing containers may be designed for the same maximum weight. The apparatus according to the invention allows a more efficient dosing, even if a mixing container is used having the same capacity as that of a conventional apparatus. Thus, all together, a considerable increase of the performance with only a slightly increased constructive effort is achieved in comparison to a conventional apparatus having only a single weighing container.

In particular, the apparatus preferably comprises exactly two weighing containers, relating to the flow of material, between the feeding devices and the mixing container. When the feeding devices for the respective material components are distributed among exactly two weighing containers, an optimal relation results between the saving of time due to simultaneous filling and weighing of the two weighing containers, and the required space of the weighing containers. Two weighing containers arranged side by side may well be arranged above a stationary mixing container. If there were more than two weighing containers, these would have to be designed comparatively small, and the useable space would be reduced due to the additional walls present between the respective weighing containers.

Furthermore, the mentioned object is achieved by a plastics processing machine having an apparatus of the kind described above.

Useful details of the invention are indicated in the dependent claims.

Preferably, each of the feeding devices comprises a feeding opening for letting the respective material component into the assigned weighing container, and the feeding opening is arranged above this weighing container. A suitable distribution of the feeding openings above the weighing containers allows to achieve that, when filling the weighing containers, the pouring cones emerging below the individual feeding openings have cone tips that are clearly remote from each other, so that the utilisation of the space of each weighing container is improved.

Preferably, the weighing containers each have, at a height of a maximal cross section, a larger extension in a longitudinal direction than in a direction perpendicular to this longitudinal direction, and, preferably, the feeding openings assigned to the weighing container are arranged with an offset between each other in the longitudinal direction above the weighing container. The terms "cross section" and "extension" each relate to the inside of the weighing container. Because of the shape of the weighing containers as described above, in particular, two weighing containers, which, for example, have a maximal cross section being substantially rectangular, may especially well be arranged together side by side on a space having an approximately quadratic cross section above the mixing container.

Preferably, at least two of the feeding devices of the storage containers are assigned to a weighing container. In particular, preferably, to each weighing container there are at least two of the feeding devices of the storage containers assigned. For example, for usage of the apparatus in a batch operation, i.e. a batch-wise weighing and mixing of components, with a batch (filling amount of the mixing container) having four components, two feeding devices per storage container may be present, and with a batch having six components, three feeding devices per storage container may be present.

Preferably, the weighing containers are arranged side by side. In particular, preferably, the longitudinal directions of both weighing containers are arranged parallel to each other, and the weighing containers are proximate transverse to the longitudinal direction. This facilitates an optimal utilisation of the space.

Preferably, each weighing container comprises a first half-basin and a second-half-basin opposite to the first half-basin, between which the closeable discharge opening is formed at the bottom of the weighing container, wherein the half-basins engage each other and are arranged movable relative to each other, such that the discharge opening is openable by moving at least one of the two half-basins and is closeable by moving the half-basin in the opposite direction. In particular, an opening lip of the discharge opening is formed at least at one of the two half-basins at the lower edge of that half-basin, which opening lip lies against the other half-basin when the discharge opening is closed. The moving of the at least one half-basin for opening and closing is, in each case, effected transverse to the longitudinal direction of the weighing containers.

Preferably, the discharge opening is openable by rotating at least one half-basin around a rotation axis and is closable by rotating it in the opposite direction, wherein the rotation axis preferably is parallel to the longitudinal direction of the weighing container. Thus, a bearing of the half-basins relative to each other may be arranged outside the area between the two weighing containers, so that the space above the mixing container is utilisable in an efficient manner for a utilisable volume of the weighing containers.

When an opening lip extends in a longitudinal direction of the weighing container, and when a discharge opening extends in this direction, an especially fast discharging of the weighing containers into the mixing container is possible, because the discharge opening can open uniformly along the full length of the opening lip.

Preferably, at least one half-basin of each weighing container is simultaneously movable through an actuating device, that is, they are in particular openable simultaneously. For example, for opening the discharge opening, the first half-basin of each weighing container is moved by the single actuating device. A particular efficient opening is achievable, if two weighing containers are correspondingly mirror-symmetrically arranged. For example, the first half-basins, which are movable for opening the discharge openings, preferably are arranged proximate to each other.

Preferably, the apparatus further comprises a control device arranged for simultaneously feeding material components to two weighing containers by feeding, through actuating a feeding device at the respective weighing container, a predetermined amount of a material component from a storage container to the respective weighing container, wherein the control device is further adapted to feed several material components one after another to a weighing container, wherein the amount that is fed of the respective material component is checked by weighing using the weighing device of the weighing container. The process for dosed mixing of pourable material components, which is controlled by the control device, comprises, for example, the following steps:

feeding, to each of two weighing containers, a respective material component, by feeding a predetermined amount of a material component from a storage container to the respective weighing container by actuating a feeding device at the respective weighing container;

weighing the content of the weighing container using the weighing device of the respective weighing container;

repeating the two previously mentioned steps at least once; and discharging the weighing containers into the mixing container.

Furthermore, the control device may be adapted to suspend the feeding of material components to a weighing container during a weighing procedure at this weighing container. Preferably, therein, the feeding of material components to any weighing container is suspended, so that a vibration-free weighing procedure is facilitated.

Preferably, the control device is adapted to determine a deviation of a desired value after checking the amount that has been fed of a material component, and to subsequently feed, dependent on a determined deviation, at least one correction amount of at least one material component to at least one of the weighing containers. In this manner, time, which has been gained by parallel filling and weighing of the weighing containers, may be utilised to better approximate a predetermined proportion of the amounts of the several material components. Thereby, the complying with a predetermined proportion of amounts is better achievable than when proceeding according to a conventional operation mode, in which the checking of the amount that has been fed of a material component by weighing is merely used to control the feeding device for the respective material component in a corrected manner only at a subsequent new filling of the weighing containers, for example, by opening a feeding opening for a longer time, if it has been determined at the previous filling of the weighing container that too few material had been filled in during the initial opening time. According to the invention, even a too large amount of a material component may at least be approximately compensated by adding correcting amounts of other material components.

Preferably, the apparatus furthermore comprises a weighing device for weighing the content of the mixing container. Thereby, by measuring the loss of weight in the mixing container, the current performance of a connected plastics processing machine may always be measured and controlled, for example, in the case of an extruder, by controlling its rotation speed.

The increased efficiency of mixing, which is achieved by the invention, is explained below exemplarily.

Example 1

A batch having four components with the respective portions by weight of 80%, 7%, 1% and 12% is assumed.

In general, preferably, the material components are assigned to the weighing containers such that, if at least two material components remain that have to be filled into the weighing containers, of the remaining material components to be filled in at least two components having the maximal proportions of quantity are filled in simultaneously. Thus, here, first the components 1 and 4 are filled in, and subsequently the components 2 and 3 are filled in.

For a conventional machine having a single weighing container, in which the material components are weighed one after another, the time needed results from adding the respective times for filling in the material components, plus four times the time needed for a weighing procedure. An apparatus according to the invention, which has two weighing containers, allows to simultaneously fill in and weigh the first and the fourth component (80%, 12%), and to subsequently fill in and weigh the third and the second component (1%, 7%) simultaneously. When the throughput rates of filling in the respective material components approximately correspond to each other, thus, the time that is saved in comparison to the conventional machine amounts to the time for filling in the fourth component having a proportion of 12% and the third component having a proportion of 1%, and the time for a weighing procedure is required only twice.

When typical times for filling in one material component are in the range of 0 to 10 seconds, and the time needed for a weighing procedure is, for example, 2 seconds, both the parallel filling and the parallel weighing result in considerable savings of time.

Example 2

The largest savings of time are yielded, when the material components require pair-wise the same amount of time for filling in, for example, if the same filling rates of material components are assumed for material components of portions of 40%, 10%, 10% and 40%.

If, in this case, the components 1 and 4 (40%, 40%) are simultaneously filled in into two weighing containers and are weighed simultaneously, and if subsequently the components 2 and 3 (10%, 10%) are simultaneously filled in and simultaneously weighed, savings of time of 50% result, in comparison to a conventional machine having a single weighing container, both for the filling as well as for the weighing procedures.

Furthermore, depending on the composition of a batch, by utilising the respective maximal volume of at least one of the weighing containers, the total weight of the batch may be increased, provided that a mixing container having a sufficiently large capacity is provided. For example, in the example 1 the minimal free capacity namely of the first weighing container of approximately (100%−81%)=19% of the nominal capacity (100%) may be utilised for increasing the amount of material by 19/81=23%. In the example 2, the minimal free capacity of both weighing containers of approximately (100%−50%)=50% may be used for increasing the amount of material by 50/50=100%, that is a doubling. Thereby, the efficiency is further considerably increased, because the time consuming weighing procedures become even more seldom. Generally spoken, preferably, the material components are assigned to the weighing containers such that the amounts of material are distributed as even as possible among the weighing containers.

A preferred embodiment of the invention will now be described in conjunction with the drawings in which:

DETAILED DESCRIPTION

Figure 1:
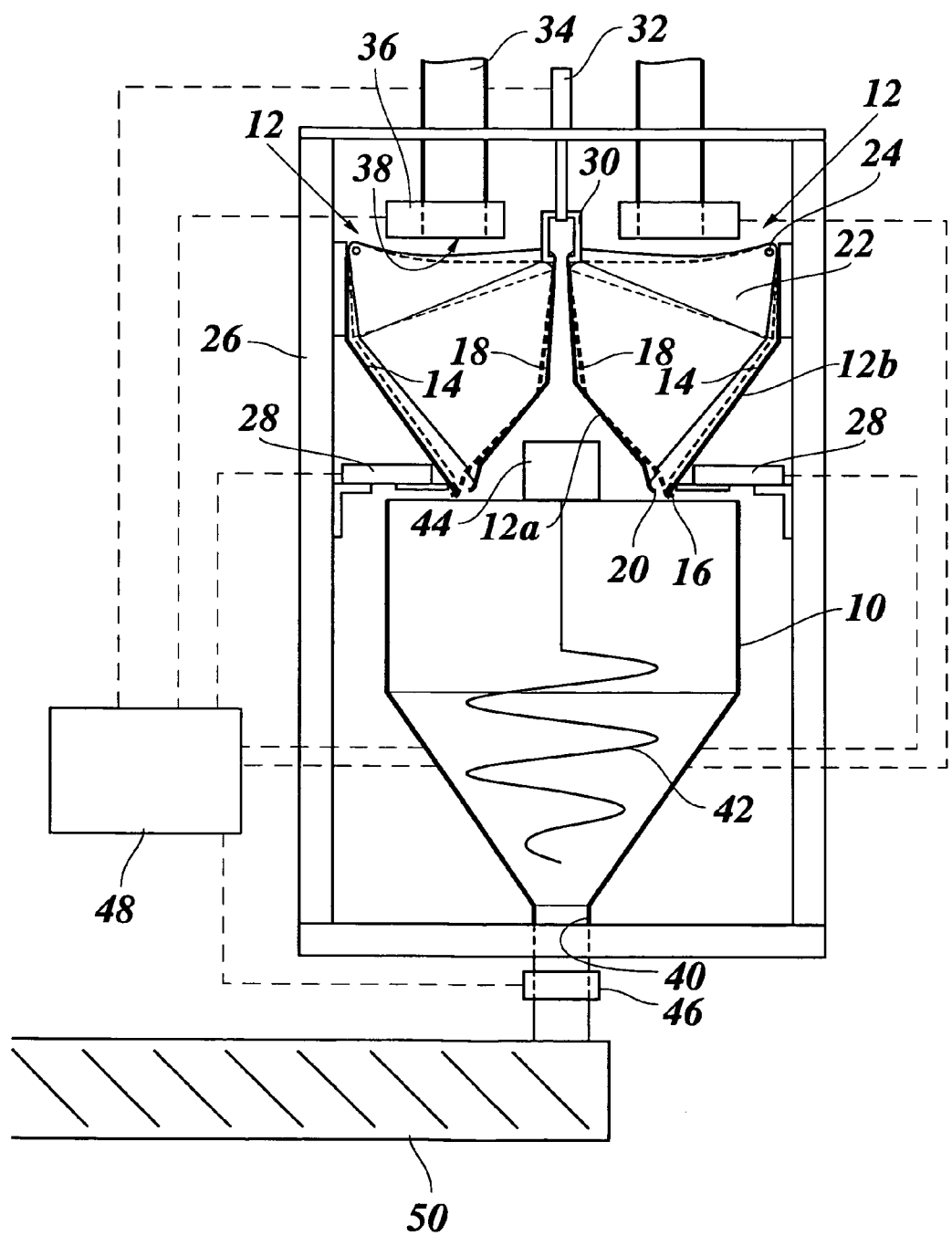
FIG. 1 is a schematic sectional view of an apparatus according to the invention having a mixing container and two weighing containers arranged above the mixing container.

FIG. 1 schematically shows a gravimetric dosing apparatus for dosed mixing of pourable material components, having one mixing container 10 and two weighing containers 12 arranged thereabove.

Each weighing container 12 is composed of a first half-basin 12a and a second half-basin 12b. The half-basins 12a and 12b face each other. Therein, the half-basin 12b forms an outer wall 14 of the weighing container 12, which extends transverse to the plane of projection of FIG. 1. This outer wall 14 is divided in two straight sections, of which an upper section substantially extends downwards, and a lower section is inclined towards the inside. The lower section of the outer wall 14 ends at an edge 16 extending horizontally.

The first half-basin 12a forms a wall 18 of the weighing container 12, which is opposite to the outer wall 14. This wall 18 is also divided in two straight sections, of which an upper section approximately extends vertically, and a lower section is inclined towards the direction of the edge 16 of the outer wall 14. The lower section of the wall 18 ends at an edge 20 which extends horizontally, near the edge 16.

Furthermore, the second half-basin 12b and the first half-basin 12a form front and rear walls 22 of which in FIG. 1 only the rear walls are shown. The walls 22 of the respective half-basins 12a and 12b partially overlap and are inclined slightly inwards in a lower area.

The first half-basin 12a is supported to be rotatable around a rotation axis 24 with regard to the second half-basin 12b. The rotation axis 24 extends parallel to an upper edge of the outer wall 14 near that upper edge, and perpendicular to the plane of projection of FIG. 1. The first half-basin 12a is rotatable with respect to the second half-basin 12b, so that in an open state, a discharge opening is formed between the edges 16 and 20 of the two half-basins, which discharge opening is closed in a closed state of the weighing container 12 by an opening lip, which is formed by the edge 20, lying against an opening lip, which is formed by the edge 16. In FIG. 1, the first half-basin 12a is shown in solid lines in the open state of the weighing container 12 and in dashed lines in the closed state of the weighing container 12.

The inner volume of each weighing container 12 is composed of an upper area, which has substantially the shape of a cuboid, and a lower area, which is substantially wedge-shaped, so that, in the open state, the weighing container 12 forms a funnel.

The weighing containers 12 are supported by a frame 26 of the apparatus, and at each weighing container 12, a weighing device 28 in the form of a force meter known as such is arranged, which is fastened to the frame 26, and on which the weighing container 12 is supported such that, using the weighing device 28, the weighing container 12 can be weighed.

At the upper edge of the wall 18 of each weighing container 12, an actuating device 32 engages through hook members 30, by which the first half-basins 12a are rotatable with respect to the second half-basins 12b by slightly lifting the first half-basins 12a, in order to open the discharge openings of the weighing containers 12.

Above each weighing container, several storage containers 34 having feeding devices 36 are arranged in a row in FIG. 1, through which the respective weighing container 12 may be filled via a feeding opening 38 of the respective feeding device 36 from the respective storage container 34. In FIG. 1, only a lower section is shown of each storage container 34.

Figure 2:
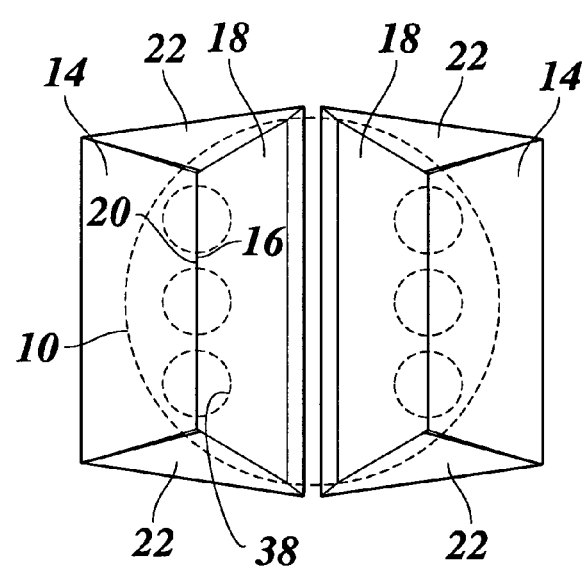
FIG. 2 is a sketch illustrating the arrangement of the weighing containers above the mixing container as seen from above.

FIG. 2 schematically shows the weighing containers 12 as viewed from above, when the discharge opening between the lower edges 16 and 20 of the respective walls 14 and 18 is closed. FIG. 2 exemplarily shows the arrangement of three feeding openings 38 of corresponding storage containers 34, which feeding openings 38 are arranged in a row along a longitudinal direction of the respective weighing container 12. As can be further seen in FIG. 2, the weighing containers 12 each have a maximal cross-sectional area in the upper area, which has a trapezoidal, approximately rectangular cross-section. In the area of the lower sections of the outer wall 14 and the wall 18, the weighing containers 12 taper downwards, being funnel-shaped.

The mixing container 10, which is arranged below the weighing containers 12, has an upper, cylindrical section and tapers, being funnel-shaped, in the lower area, wherein a bottom of the mixing container 10 forms an envelope of a cone, which ends at a lower opening 40 of the mixing container 10. A stirring device 42, which is schematically shown in FIG. 1, is arranged in the mixing container 10, and is driven by a motor 44 arranged above the mixing container 10. A closing device 46 is provided at the lower opening 40 of the mixing container 10.

As FIG. 2 shows, the discharge openings, which are created at the edges 16 and 20 of the weighing containers 12, when the weighing containers 12 are opened, are arranged above the mixing container 10 such that bulk material discharged through them falls into the mixing container 10 which is open at its upper side.

FIG. 1 schematically shows a control device 48 for the apparatus, which is, in particular, connected to the feeding devices 36, the actuating device 32, the weighing devices 28 and the closing device 46.

Below the mixing container 10, for example, a further device of a plastics processing machine is connected through the closing device 46, the described apparatus serving for filling said further device. FIG. 1 exemplarily shows an extruder 50, which is also controlled by the control device 48.

In the example shown, three storage containers having respective feeding devices 36 are assigned to each of the weighing containers 12. Therefore, the described apparatus is suitable for composing batches of up to six material components, wherein the two weighing containers 12 may simultaneously be filled each with a material component assigned to the respective weighing container. However, this number of feeding devices is only one possible example.

Before filling the weighing container 12, its weight is measured by the weighing device 28, if it is not already known. The feeding of a material component from a storage container 34 to the respective weighing container 12 takes place by the control device 48 suitably temporarily controlling the feeding device 36, wherein the throughput rate of the material component through the feeding opening 38 is, for example, known or is estimated. After a specific amount of the material component has been fed, the feeding opening 38 is closed, and the control device 48 controls the respective weighing device 28 in order to determine the weight of the weighing containers 12 and its content. From the weight determined after the filling, and from the previous weight of the weighing container 12, the control device 48 calculates the mass of the fed material. Afterwards, a further material component may fed to the same weighing container 12 through a different feeding device 36, whereby a pouring cone is created at a different position due to the arrangement of the feeding openings 38 side by side.

After each of the weighing containers 12 has been filled with the required material components and has been weighed, the control device 48 drives the actuating device 32 in order to discharge the weighing containers 12 into the mixing container 10. In order to ensure that no rests remain in the weighing containers 12, the control device 48 may again drive the actuating device 32 a shorter time later.

Then, the material components are mixed in the mixing container 10 using the stirring device 42, and, finally, the extruder 50 is filled through the closing device 46.

Optionally, the control device 48 is adapted to subsequently feed one or more correcting amounts of one or more material components to one or to both of the weighing containers, depending on a determined deviation of the mass of a material component, which has been fed to the weighing container 12, from a desired value. If, for example, too little of a specific material component has been filled in, the control device 48 is able to add further material by correspondingly actuate the respective feeding device 36 temporarily. Preferably, thereupon, a new weighing of the respective weighing container 12 is performed.

What is claimed is:

1. Apparatus for dosed mixing of pourable material components, comprising:
   a mixing container,
   two weighing containers, wherein each of the weighing containers comprises a closable discharge opening for discharging content of the weighing container into the mixing container and comprises a weighing device for weighing the content of the weighing container, and several storage containers for respective material components, wherein a weighing container is assigned to each storage container, and wherein each storage container comprises a feeding device for feeding material from the storage container to the weighing container that is assigned to said storage container, and wherein at least two of the feeding devices of respective storage containers are assigned to each weighing container, wherein the mixing container is arranged below the weighing containers such that the weighing containers are simultaneously dischargeable through the discharge openings into the mixing container, wherein the apparatus comprises exactly two weighing containers between the feeding devices and the mixing container, wherein each of the feeding devices comprises a feeding opening for letting the respective material component into the assigned weighing container, which feeding opening is arranged above the respective said weighing container, wherein the weighing containers each have, at a height of a maximal cross-section, a larger dimension in a longitudinal direction than in a direction transverse to the longitudinal direction, and wherein the feeding openings, which are assigned to the respective weighing container, are arranged with an offset from each other in the longitudinal direction above the weighing container, in order that pouring cones emerging below the individual feeding openings have cone tips that are remote from each other, and wherein the two weighing containers are arranged side by side above the mixing container, the longitudinal directions of both weighing containers being arranged parallel to each other, the weighing containers being proximate transverse to the longitudinal direction.

2. Apparatus according to claim 1, wherein each weighing container comprises a first half-basin and a second half-basin opposite to the first half-basin, between which the closeable discharge opening is formed at a bottom of the weighing container, and wherein the half-basins are engaged with each other and are arranged movably relative to each other such that the discharge opening is openable by moving at least one of the two-half-basins in one direction and is closable by moving the half-basin in an opposite direction.

3. Apparatus according to claim 2, further comprising an actuating device for simultaneously moving at least one half-basin of each of the weighing containers.

4. Apparatus according to claim 1, further comprising a control device which is adapted to feed material components to two weighing containers simultaneously by feeding, through actuating a said feeding device at the respective weighing container, a predetermined amount of a material component from a said storage container to the respective weighing container, wherein the control device further is adapted to feed several material components to a said weighing container one after another, wherein an amount, which has been fed of the respective material component, is checked by weighing using the weighing device associated with the weighing container.

5. Apparatus according to claim 4, wherein the control device is adapted to determine a deviation from a desired value, after checking the amount of a material component that has been fed, and to subsequently feed, depending on a determined deviation, at least one correcting amount of at least one material component to at least one of the weighing containers.

6. Apparatus according to claim 1, wherein the two weighing containers are arranged side by side directly above the mixing container.

* * * * *